(12) United States Patent
Chen et al.

(10) Patent No.: US 7,001,531 B2
(45) Date of Patent: Feb. 21, 2006

(54) SUSTAINED RELEASE COOLANT ADDITIVE COMPOSITION

(75) Inventors: Yu-Sen Chen, Naperville, IL (US); Doug Hudgens, Cookeville, TN (US); Thomas J. Blakemore, Flossmoor, IL (US); Joseph C. Drozd, Park Ridge, IL (US)

(73) Assignees: Dober Chemical Corp., Midlothian, IL (US); FleetGuard, Inc., Nashiville, TN (US)

( * ) Notice: Subject to any disclaimer, the term of this patent is extended or adjusted under 35 U.S.C. 154(b) by 0 days.

(21) Appl. No.: 09/939,527

(22) Filed: Aug. 24, 2001

(65) Prior Publication Data

US 2003/0042208 A1 Mar. 6, 2003

(51) Int. Cl.
*C09K 5/00* (2006.01)

(52) U.S. Cl. .............................. 252/71; 252/74; 252/75; 252/76

(58) Field of Classification Search .................. 252/71, 252/74, 75, 76
See application file for complete search history.

(56) References Cited

U.S. PATENT DOCUMENTS

| | | | |
|---|---|---|---|
| 2,280,792 A | 4/1942 | Bruson | 260/464 |
| 2,754,330 A | 7/1956 | Schreyer | 260/585 |
| 2,782,240 A | 2/1957 | Hefner et al. | 260/613 |
| 2,841,479 A | 7/1958 | Hefner et al. | 44/58 |
| 2,928,877 A | 3/1960 | Jaul et al. | 260/584 |
| 2,955,028 A | 10/1960 | Bevans | |
| 3,087,436 A | 4/1963 | Dettlof et al. | 103/130 |
| 3,172,892 A | 3/1965 | Le Suer et al. | 260/326.5 |
| 3,215,707 A | 11/1965 | Rense | 260/326.5 |
| 3,231,587 A | 1/1966 | Rense | 260/346.8 |
| 3,272,746 A | 9/1966 | Le Suer et al. | 252/47.5 |
| 3,275,554 A | 9/1966 | Wagenaar | 252/50 |
| 3,336,223 A | 8/1967 | Kneeland | 252/9 |
| 3,361,673 A | 1/1968 | Stuart et al. | 252/51.5 |
| 3,368,972 A | 2/1968 | Otto | 252/47.5 |
| 3,413,347 A | 11/1968 | Worrel | 260/570.5 |

(Continued)

FOREIGN PATENT DOCUMENTS

| | | |
|---|---|---|
| EP | 0279863 | 8/1988 |
| EP | 0448365 | 9/1991 |
| EP | 0476485 | 3/1992 |
| EP | 0516838 | 12/1992 |
| EP | 0573578 | 12/1993 |

*Primary Examiner*—Charles Boyer
*Assistant Examiner*—D. G. Hamlin
(74) *Attorney, Agent, or Firm*—Slout, Uxa, Buyan & Mullins, LLP; Frank J. Uxa

(57) ABSTRACT

A coolant additive composition comprising a sustained release component and an additive component, the additive component is effective to provide at least one benefit to a coolant when released into the coolant, the sustained release component includes a polymeric material and is effective to reduce the rate of release of the additive component into the coolant relative to an identical composition without the sustained release component.

28 Claims, 1 Drawing Sheet

U.S. PATENT DOCUMENTS

| | | | |
|---|---|---|---|
| 3,422,157 A | 1/1969 | Kaufman et al. | 260/624 |
| 3,438,757 A | 4/1969 | Honnen et al. | 44/58 |
| 3,440,029 A | 4/1969 | Little et al. | 44/75 |
| 3,454,555 A | 7/1969 | van der Voort et al. | 260/239 |
| 3,454,607 A | 7/1969 | Le Suer et al. | 260/408 |
| 3,565,804 A | 2/1971 | Honnen et al. | 252/50 |
| 3,574,576 A | 4/1971 | Honnen et al. | 44/72 |
| 3,598,738 A | 8/1971 | Biswell et al. | 252/59 |
| 3,649,229 A | 3/1972 | Otto | 44/73 |
| 3,671,511 A | 6/1972 | Honnen et al. | 260/93.7 |
| 3,697,574 A | 10/1972 | Piasek et al. | 260/462 R |
| 3,715,037 A | 2/1973 | Hu | |
| 3,725,277 A | 4/1973 | Worrel | 252/51.5 R |
| 3,726,882 A | 4/1973 | Traise et al. | 210/296 |
| 3,749,247 A | 7/1973 | Rohde | 210/205 |
| 3,755,433 A | 8/1973 | Miller et al. | 252/51.5 R |
| 3,756,793 A | 9/1973 | Robinson | 44/62 |
| 3,790,359 A | 2/1974 | Feldman | 44/62 |
| 3,822,289 A | 7/1974 | Clark et al. | 260/332.8 |
| 3,849,085 A | 11/1974 | Kreuz et al. | 44/78 |
| 3,877,899 A | 4/1975 | Bundy et al. | 55/272 |
| 3,880,569 A | 4/1975 | Bannister et al. | |
| 3,912,764 A | 10/1975 | Palmer, Jr. | 260/346.8 |
| 3,932,537 A | 1/1976 | Wetzel et al. | 260/624 C |
| 3,954,808 A | 5/1976 | Elliott et al. | 260/343.2 |
| 3,977,992 A | 8/1976 | Hofacker | 252/316 |
| 3,980,589 A | 9/1976 | Murrell et al. | 252/473 |
| 3,999,960 A | 12/1976 | Langer, Jr. et al. | 44/62 |
| 4,026,809 A | 5/1977 | Lachowicz et al. | 252/51.5 A |
| 4,032,700 A | 6/1977 | Song et al. | 526/43 |
| 4,066,559 A | 1/1978 | Rohde | 252/10 |
| 4,075,097 A | 2/1978 | Paul | |
| 4,075,098 A | 2/1978 | Paul et al. | 210/168 |
| 4,110,349 A | 8/1978 | Cohen | 260/346.74 |
| 4,125,382 A | 11/1978 | O'Brien et al. | 44/51 |
| 4,129,421 A | 12/1978 | Webb | |
| 4,137,185 A | 1/1979 | Gardiner et al. | 252/33 |
| 4,156,061 A | 5/1979 | Pappas et al. | 526/20 |
| 4,214,994 A | 7/1980 | Kitano et al. | |
| 4,222,746 A | 9/1980 | Sweeney et al. | |
| 4,231,759 A | 11/1980 | Udelhofen et al. | 44/75 |
| 4,234,435 A | 11/1980 | Meinhardt et al. | 252/47.5 |
| 4,238,628 A | 12/1980 | Cahill et al. | 568/736 |
| 4,247,301 A | 1/1981 | Honnen | 44/63 |
| 4,261,704 A | 4/1981 | Langdon | 44/62 |
| 4,265,748 A | 5/1981 | Villani et al. | |
| 4,294,586 A | 10/1981 | Cox, Jr. | 44/56 |
| 4,320,019 A | 3/1982 | Hayashi | 585/285 |
| 4,323,714 A | 4/1982 | Malloy et al. | 568/766 |
| 4,326,972 A | 4/1982 | Chamberlin, III | 252/32.3 |
| 4,357,250 A | 11/1982 | Hayashi | 252/51.5 A |
| 4,365,973 A | 12/1982 | Irish | |
| 4,379,065 A | 4/1983 | Lange | 252/51.5 A |
| 4,460,379 A | 7/1984 | Sweeney et al. | 44/56 |
| 4,469,908 A | 9/1984 | Burress | 585/467 |
| 4,515,740 A | 5/1985 | Schuettenberg et al. | |
| 4,561,981 A | 12/1985 | Characklis | 210/696 |
| 4,639,255 A | 1/1987 | Schuettenberg et al. | 44/62 |
| 4,658,078 A | 4/1987 | Slaugh et al. | 585/512 |
| 4,663,063 A | 5/1987 | Davis | 252/51.5 R |
| 4,668,834 A | 5/1987 | Rim et al. | 585/12 |
| 4,673,527 A | 6/1987 | Goudy, Jr. et al. | 252/181 |
| 4,708,809 A | 11/1987 | Davis | 252/33.4 |
| 4,717,495 A | 1/1988 | Hercamp et al. | 252/75 |
| 4,728,452 A | 3/1988 | Hansen | 252/75 |
| 4,740,321 A | 4/1988 | Davis et al. | 252/33.4 |
| 4,755,189 A | 7/1988 | Feldman | 44/62 |
| 4,756,844 A | 7/1988 | Walles et al. | 252/95 |
| 4,849,569 A | 7/1989 | Smith, Jr. | 585/446 |
| 4,857,073 A | 8/1989 | Vataru et al. | 44/57 |
| 4,862,908 A | 9/1989 | Payer | |
| 4,892,562 A | 1/1990 | Bowers et al. | 44/67 |
| 4,904,401 A | 2/1990 | Ripple et al. | 252/32.7 E |
| 4,937,299 A | 6/1990 | Ewen et al. | 526/119 |
| 4,980,075 A | 12/1990 | Dobrez et al. | 252/71 |
| 4,981,602 A | 1/1991 | Ripple et al. | 252/32.7 E |
| 5,019,669 A | 5/1991 | Adams et al. | 585/446 |
| 5,032,259 A | 7/1991 | He et al. | 210/133 |
| 5,050,549 A | 9/1991 | Sturmon | 123/198 E |
| 5,053,152 A | 10/1991 | Steckel | 252/50 |
| 5,059,217 A | 10/1991 | Arroyo et al. | 44/639 |
| 5,071,919 A | 12/1991 | DeGonia et al. | 525/285 |
| 5,089,041 A | 2/1992 | Thompson et al. | 71/64.11 |
| 5,094,666 A | 3/1992 | Feldman et al. | 44/388 |
| 5,120,349 A | 6/1992 | Stewart et al. | 71/93 |
| 5,137,978 A | 8/1992 | Degonia et al. | 525/285 |
| 5,137,988 A | 8/1992 | Matzner et al. | 525/471 |
| 5,160,648 A | 11/1992 | Steckel | 252/47.5 |
| 5,186,732 A | 2/1993 | Thompson et al. | 71/64.11 |
| 5,192,335 A | 3/1993 | Cherpeck | 44/387 |
| 5,230,714 A | 7/1993 | Steckel | 44/432 |
| 5,235,936 A | 8/1993 | Kracklauer | |
| 5,249,552 A | 10/1993 | Brooks | 123/1 |
| 5,286,823 A | 2/1994 | Rath | 526/237 |
| 5,296,154 A | 3/1994 | Steckel | 252/51.5 R |
| 5,300,701 A | 4/1994 | Cherpeck | 568/792 |
| 5,324,800 A | 6/1994 | Welborn, Jr. et al. | 526/160 |
| 5,332,407 A | 7/1994 | Herbstman | 44/419 |
| 5,336,278 A | 8/1994 | Adams et al. | 44/419 |
| 5,337,705 A | 8/1994 | Lane | 123/41.33 |
| 5,346,965 A | 9/1994 | Dever et al. | 525/379 |
| 5,368,615 A | 11/1994 | Steckel | 44/338 |
| 5,372,942 A | 12/1994 | McGarrity et al. | 435/227 |
| 5,407,594 A | 4/1995 | Fry et al. | 252/90 |
| 5,408,018 A | 4/1995 | Rath | 526/237 |
| 5,456,217 A | 10/1995 | Thunker et al. | 123/1 A |
| 5,458,793 A | 10/1995 | Adams et al. | 252/47 |
| 5,483,327 A | 1/1996 | Taya et al. | |
| 5,496,383 A | 3/1996 | Franz et al. | 44/432 |
| 5,507,942 A | 4/1996 | Davis | 210/94 |
| 5,508,356 A | 4/1996 | Dever et al. | 525/319 |
| 5,527,452 A | 6/1996 | Grigoriev et al. | 210/130 |
| 5,565,106 A | 10/1996 | Sherbondy et al. | 210/700 |
| 5,567,845 A | 10/1996 | Franz et al. | 504/278 |
| 5,573,557 A | 11/1996 | Thünker et al. | 44/639 |
| 5,580,359 A | 12/1996 | Wright | 44/321 |
| 5,591,330 A | 1/1997 | Lefebvre | 210/203 |
| 5,620,949 A | 4/1997 | Baker et al. | 508/452 |
| 5,643,351 A | 7/1997 | Lew et al. | 71/64.13 |
| 5,662,799 A | 9/1997 | Hudgens et al. | 210/192 |
| 5,662,803 A | 9/1997 | Young | 210/698 |
| 5,663,457 A | 9/1997 | Kolp | 568/790 |
| 5,674,950 A | 10/1997 | Thaler et al. | 525/337.1 |
| 5,691,422 A | 11/1997 | Emert et al. | 525/338 |
| 5,695,531 A | 12/1997 | Makino et al. | 44/639 |
| 5,696,060 A | 12/1997 | Baker et al. | 508/222 |
| 5,696,067 A | 12/1997 | Adams et al. | 508/476 |
| 5,711,894 A | 1/1998 | Miyake et al. | 252/76 |
| 5,718,836 A | 2/1998 | Nakatani et al. | 252/74 |
| 5,739,356 A | 4/1998 | Dietz et al. | 549/285 |
| 5,741,433 A | 4/1998 | Mitchell et al. | 252/74 |
| 5,752,989 A | 5/1998 | Henly et al. | 44/347 |
| 5,752,991 A | 5/1998 | Plavac | 44/424 |
| 5,756,435 A | 5/1998 | Carey et al. | 508/550 |
| 5,772,873 A | * 6/1998 | Hudgens et al. | 210/192 |
| 5,777,041 A | 7/1998 | Emert et al. | 525/333.7 |
| 5,777,142 A | 7/1998 | Adams et al. | 554/213 |
| 5,780,554 A | 7/1998 | Emert et al. | 525/370 |
| 5,786,490 A | 7/1998 | Dietz et al. | 549/269 |
| 5,803,024 A | * 9/1998 | Brown | 123/41.15 |
| 5,833,722 A | 11/1998 | Davies et al. | 44/418 |

| | | | | | |
|---|---|---|---|---|---|
| 5,840,920 A | 11/1998 | Baker .................. 549/266 | 6,074,445 A | 6/2000 | Ahmed |
| 5,856,524 A | 1/1999 | Dietz et al. ............ 549/283 | 6,114,547 A | 9/2000 | Baker et al. .......... 549/292 |
| 5,880,219 A | 3/1999 | Thaler et al. .......... 525/331.7 | 6,140,541 A | 10/2000 | Melder et al. ......... 564/475 |
| 5,897,770 A | 4/1999 | Hatch et al. ........... 210/101 | 6,183,524 B1 | 2/2001 | Ahmed |
| 5,919,869 A | 7/1999 | Thaler et al. .......... 525/331.7 | 6,238,554 B1 | 5/2001 | Martin Jr. |
| 5,948,248 A * | 9/1999 | Brown ................... 210/206 | RE37,369 E * | 9/2001 | Hudgens et al. ....... 210/192 |
| 6,010,639 A | 1/2000 | Mitchell et al. ........ 210/176 | | | |
| 6,017,369 A | 1/2000 | Ahmed .................. 44/302 | | | |
| 6,020,500 A | 2/2000 | Baker et al. ........... 549/292 | * cited by examiner | | |

SUSTAINED RELEASE COOLANT ADDITIVE COMPOSITION

FIELD OF THE INVENTION

The present invention relates generally to coolant additive compositions for use with cooling or coolant systems, for example, but not limited to, such systems in internal combustion engines. More particularly, the present invention is directed to coolant additive compositions comprising a coolant additive component and a sustained release component for use in coolant systems, for example, but not limited to, internal combustion engine coolant systems, such as those in automobiles, trucks, heavy equipment and the like, open circulating coolant systems, such as cooling towers, and the like.

BACKGROUND OF THE INVENTION

Coolants are often needed in stationary and vehicular engines, for example internal combustion engines, to maintain system temperatures suitable for effective operation. Such coolants, for example, liquid coolants, are circulated through an engine cooling or coolant system and frequently require filtering and/or additive addition to maintain effective system operation. Filtering of a circulating coolant removes debris and particulate matter from the coolant. Long term use of a coolant often requires that the coolant be fortified with one or more supplemental additives, such as corrosion inhibitors, anti-foaming agents and/or other known coolant additives for maintaining quality of the coolant and/or cooling system. Such additives are typically directly added to the coolant in the form of a concentrated aqueous solution, or in solid granular or powder form.

Traditionally, additives such as anti-foulants, anti-scaling agents, corrosion inhibitors, buffering and pH agents, microbiocides and the like are added directly to aqueous or glycol-based liquid coolants of cooling systems on an "as-needed" basis, or at regularly scheduled time periods. Coolant additives provide at least one benefit to the coolant and/or cooling system, for example, to prevent scale deposition, corrosion of metal surfaces and similar fouling of the cooling system, maintain proper acidity/alkalinity, e.g., pH levels in the coolant and the like benefit. As used herein, a cooling system includes, without limitation, an open circulating cooling system, for example, a cooling tower and the like; and a substantially closed cooling system, for example, an internal combustion engine cooling system, such as those associated with vehicles, heavy equipment and the like. Also, as used herein, a "system" preferably includes a circulating coolant, for example, coolant liquid. In addition, a system may include a circulating liquid pump, tubing, etc.

In many cooling systems, it is preferable to maintain a steady level of additives. For example, the presence of microbiocides is especially important in an aqueous system such as cooling systems employed in cooling towers. Cooling towers are often run continuously or are at least available for use for considerable lengths of time. Typically, such cooling systems do not have sufficient aeration and exposure to sunlight to prevent microbial, especially bacterial and fungal, growth. In particular, many cooling systems use fill composed of beads of synthetic polymer or other materials, in order to extend the amount of heat exchange surface area. This type of construction greatly aggravates the problem of microbiological growth, since it provides an ideal physical environment for the propagation of troublesome microbes. If left untreated, such microorganisms may flourish and produce colonies extensive enough to give rise to problems of biofilm blockage of heat exchange surfaces, as well as clogging of the components of the water transporting apparatus used in operating the aqueous system. It would clearly be advantageous to maintain an effective level of additives, such as microbiocides, in the coolants used in such cooling systems.

Various methods of introducing additives to a cooling system have been developed with an object of maintaining an appropriate, effective level of additives in the system. For instance, a solid additive material in the form of powders, pellets and the like, may be added directly to the cooling system, to be dissolved into the circulating coolant. However, this method is not effective in maintaining a steady concentration level of additive within the system. Initially, there would be a high level of the additives released into the system, and within a short time the additives are depleted. Additionally, a significant drawback of this method is the danger of overdosing the system with particular additives when the additives are initially dissolved. The overdosing is dangerous in that it can result in system erosion and corrosion problems.

Attempts have been made in the prior art to address particular water treatment systems by using controlled release coatings. For example, Characklis in U.S. Pat. No. 4,561,981 disclosed a method for controlling, preventing or removing fouling deposits, particularly in pipelines, storage tanks and the like by microencapsulating fouling control chemicals in a slow release coating. The coating material is described as being any material compatible with the fouling control chemical which is capable of sticking to the fouling deposit site.

Recently, Mitchell et al. in U.S. Pat. No. 6,010,639 disclosed that a terpolymer may be used as a coating for cooling additives.

Despite the efforts of the prior art, a need still exists for a coolant additive composition for providing a slow, sustained release of additive into a coolant in a cooling system.

SUMMARY OF THE INVENTION

New coolant additive compositions effective to reduce the release rate of an additive component into a coolant have been discovered.

In a general embodiment, coolant additive compositions are provided and comprise a sustained release component and an additive component. The additive component is effective to provide at least one benefit to a coolant when it is released into the coolant, for example, a liquid, such as substantially an aqueous liquid; a liquid comprising water and at least one freezing point depressant, such as at least one glycol; substantially a non-aqueous liquid; and the like. The sustained release component comprises a material, preferably a polymeric material, effective to reduce the rate of release of the additive component into the coolant, preferably relative to the release rate of an identical coolant additive composition without the sustained release component. Preferably, but not necessarily, the sustained release component is substantially insoluble or partially soluble in the coolant.

The sustained release component advantageously includes at least one of a matrix and a coating, for example, both a matrix and a coating.

The present coolant additive compositions have been found to be very effective in providing one or more additives to coolants, thereby prolonging the useful lives of the coolants and/or advantageously reducing the risk that an additive deficiency in the coolant may cause damage to the cooling system and/or engine or equipment associated with the cooling system. The present compositions are straightforward, can be manufactured relatively easily and cost effectively and can be used to provide the desired result or results with little or no modification of the cooling system.

In one broad aspect of the invention, coolant additive compositions are provided which comprise a matrix material and an additive component. The additive component is located, preferably substantially uniformly distributed, in the matrix material. The additive component is effective, when released into a coolant, to provide at least one benefit to the coolant. The matrix material, preferably comprising at least one polymeric material, is effective to reduce the rate of release of the additive component into the coolant relative to an identical composition without the matrix material.

Preferably, the additive component is substantially distributed throughout the matrix material. A steady rate of additive release into the coolant preferably is obtained. The additive composition may be layered to provide a variable release rate. For example, the composition in accordance with the invention may comprise an inner core layer of an additive/matrix composition having a high additive to matrix weight ratio, and an outer layer having a relatively lower additive to matrix weight ratio.

Methods for producing such additive compositions for providing a benefit to a coolant are provided. Such production methods comprise combining an additive component with a matrix material to form a mixture. The additive component is effective to provide at least one benefit to a coolant when released into the coolant. The matrix material comprises a polymeric material. One or more discrete units, e.g., solid discrete units, such as pellets, tablets, or puck-shaped forms, of the mixture are formed. The matrix material is present in an amount effective, when the one or more discrete units are contacted with a coolant, to reduce the rate of release of the additive component into the coolant.

Alternate methods of producing coolant additive compositions are provided when the composition is to include a coating, for example, a sustained release coating. Such methods comprise providing an additive composition including at least one additive effective, when released into a coolant, to provide a benefit to the coolant. It should be noted that the additive composition can include a matrix material as described elsewhere herein. A coating material is provided on the additive composition to form a coated additive composition. The coating material is partially coolant soluble and effective, when the coated additive composition is contacted with a coolant, to reduce the rate of release of the additive composition into the coolant relative to an identical additive composition without the coating material.

In an additional broad aspect of the invention, additive assemblies are provided. Such additive assemblies provide an assembly or sub-system effective for delivering additive components to a coolant, for example, a circulating coolant. Such additive assemblies include a housing including a coolant inlet and a coolant outlet; and an additive composition including an additive component effective, when released into a coolant, to provide at least one benefit to the coolant and a sustained release component, preferably a matrix and/or a coating, effective to reduce the rate of release of the additive component into the coolant relative to an identical additive composition without the sustained release component.

In addition, methods for releasing coolant additive into coolants are provided. Such methods comprise contacting the additive compositions described elsewhere herein with coolants. Such contacting is effective to cause the release, for example, the sustained release and more preferably the substantially controlled release, of the additive component in the additive composition into the coolant to provide at least one benefit to the coolant.

In a preferred embodiment, the additive component comprises at least one active ingredient selected from the group consisting of microbiocides, buffers, cavitation liner pitting inhibitors, metal corrosion inhibitors, hot surface corrosion inhibitors, defoaming agents, hot surface deposition inhibitors, scale inhibitors, detergent agents, dispersant agents, surfactants and the like and mixtures thereof.

The sustained release component preferably includes polymer repeating units derived from an olefin component having 2 to about 12 carbon atoms per molecule.

Commonly assigned U.S. patent application Ser. No. 09/939,241, filed on even date herewith, is directed to somewhat related subject matter. The disclosure of this co-pending U.S. application is incorporated in it entirety herein by reference.

Each and every feature described herein, and each and every combination of two or more of such features, is included within the scope of the present invention provided that the features included in such a combination are not mutually inconsistent.

Additional aspects and advantages of the present invention are set forth in the following description and claims, particularly when considered in conjunction with the accompanying drawings in which like parts bear like reference numerals.

DETAILED DESCRIPTION OF THE INVENTION

Figure 1:
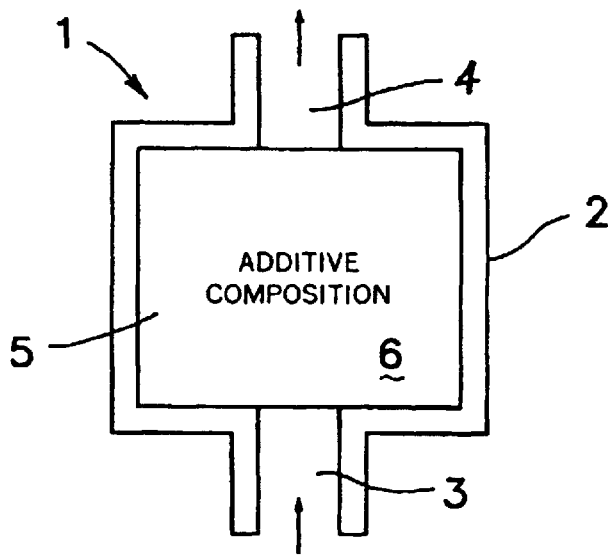
FIG. 1 is a front elevational view in full section of a coolant additive assembly according to a general embodiment of the present invention.

The present invention relates to additive compositions for use in coolant/cooling systems. The additive compositions are capable of slowly releasing additive components into coolants, for example, a liquid coolant circulating through a cooling system.

The additive compositions are useful in any suitable cooling or coolant system including both open systems and substantially closed systems. Examples of open cooling systems include cooling towers and the like. Examples of substantially closed cooling systems include cooling systems associated with engines, such as internal combustion engines. Engine cooling systems may be associated with vehicles such as automobiles, trucks and the like, as well as heavy equipment, either mobile or stationary, and the like.

The coolant into which the coolant additive component is released preferably is a circulating fluid, for example, a liquid. The coolant can have any suitable composition effective to provide the degree of cooling desired and to be compatible in the application involved. Of course, the coolant should be such as to have no substantial or significant detrimental effect on the cooling system being employed. The coolant may include, for example, substantially an aqueous liquid; a liquid comprising water and at least one freezing point depressant, such as at least one glycol; substantially a non-aqueous liquid such as one or more glycols, a glycol-based (at least about 50% by weight of one or more glycols) liquid and the like.

In one broad embodiment, the present coolant additive compositions comprise a coolant additive component, at least one of a sustained release component, a matrix material and a coating material effective, when the additive composition is placed in contact with a coolant, to reduce the rate at which the coolant additive component is released into the coolant.

Unless otherwise expressly noted to the contrary, each of the words "include," "includes," "included" and "including," the phrase "for example," and the abbreviation "e.g." as used herein in referring to one or more things or actions means that the reference is not limited to the one or more things specifically referred to.

The Coolant Additive Component

As used herein, an "additive component" and "a coolant additive component" include one or more materials which can be included within the present coolant additive compositions and which provide at least one benefit to a coolant when released into the coolant.

The additive component may comprise one or more additives typically or conventionally used in cooling systems.

In one embodiment, the additive component comprises one or more of the following: (1) buffers to maintain the desired degree of acidity/alkalinity, e.g., a neutral or alkaline pH, including for example, alkali metal phosphates, borates and the like and mixtures thereof; (2) cavitation liner pitting inhibitors including alkali metal nitrites, molybdates and the like and mixtures thereof; (3) metal corrosion inhibitors and/or hot surface corrosion inhibitors including alkali metal nitrates and silicates, carboxylic acids, phosphonic acids, phosphonates, pyrophosphates, azoles, sulfonic acids, mercaptobenzothiazoles, metal dithiophosphates, metal dithiocarbonates, phenolic anti-oxidants including 4,4'-methylenebis (2,6-di-tertbutylphenol that is commercially available under the trademark Ethyl 702 by Ethyl Corporation) and the like and mixtures thereof; (4) defoaming agents including silicone defoamers, alcohols such as polyethoxylated glycol, polypropoxylated glycol, acetylenic glycols and the like and mixtures thereof; (5) hot surface deposition inhibitors and/or scale inhibitors including phosphate esters, phosphino carboxylic acids, polyacrylates, styrene-maleic anhydride copolymers, sulfonates and the like and mixtures thereof; (6) dispersants including non-ionic and/or anionic surfactants, e.g., phosphate esters, alkyl sulfonates, aryl sulfonates, alkylaryl sulfonates, linear alkyl benzene sulfonates, alkylphenols, ethoxylated alcohols and carboxylic esters, and the like and mixtures thereof; (7) organic acids including adipic acid, sebacic acid and the like and mixtures thereof; (8) anti-gel agents including those disclosed in Feldman et al U.S. Pat. No. 5,094,666, the disclosure of which is incorporated in its entirety herein by reference, copolymers of ethylene and vinyl esters of fatty acids with molecular weights of 500–50,000, tallow amine salts of phthalic anhydride, tallow amine salts of dithio benzoic acid, 4-hydroxy,3,5-di-t-butyl dithiobenzoic acid, ethylene vinylacetate copolymers and the like and mixtures thereof; and (9) microbiocides, preferably microbiocides used in cooling towers, including those disclosed in Sherbondy et al U.S. Pat. No. 5,662,803, the disclosure of which is incorporated in its entirety herein by reference, and the like and mixtures thereof.

The additive components useful in the present invention may include one or more of the agents listed in the following Table 1. The possible functions of the agents identified in Table 1 are only intended to be exemplary, not limiting.

TABLE 1

| COMPONENT | POSSIBLE FUNCTION | TYPICAL % BY WT. IN ADDITIVE COMPONENTS |
|---|---|---|
| Alkali metal or Ammonium phosphates | corrosion inhibitor/ buffering agent | 0–80 |
| Alkali metal or ammonium phosphonate | corrosion inhibitor/ buffering agent | 0–80 |
| Alkali metal or ammonium pyrophosphate | corrosion inhibitor/ buffering agent | 0–80 |
| Alkali metal or ammonium borate | corrosion inhibitor/ buffering agent | 0–80 |
| Alkali metal or ammonium nitrites | cavitation liner pitting/corrosion inhibitor | 4–60 |
| Alkali metal or ammonium molybdates | cavitation liner pitting/corrosion inhibitor | 4–60 |
| Alkali metal or ammonium nitrates | corrosion inhibitor | 4–60 |
| Alkali metal or ammonium silicates | corrosion inhibitor | 0–40 |
| Alkali metal or ammonium salts of one or more neutralized dicarboxylic acids | corrosion inhibitor | 1–15 |
| Tolyltriazole | corrosion inhibitor | 1–15 |
| Dispersants (e.g. polyacrylic acid, phosphino carboxylic acid, phosphate esters, styrene-maleic anhydride copolymers, polmaleic acid, sulfonates and sulfonate copolymers) | deposition and scale inhibitors | 0–15 |
| Defoamers (e.g. silicones, polyethoxylated glycol, polypropoxylated glycol, acteylenic glycols) | foam inhibitor | 0–3 |

In one embodiment, the additive component includes nitrite compounds. The additive component may include a mixture of nitrite compounds and molybdate compounds to maintain a minimum concentration level of about 800 ppm of nitrite or of nitrite and molybdate in the coolant in the cooling system, with the proviso that the minimum level of nitrite in the coolant system is often about 400 ppm and preferably should be maintained at about this level. A useful additive providing nitrite compounds is sold by Fleetguard under the trademark DCA-2 Plus, which includes borate, silicate, organic acids, tolytriazole, scale inhibitors, surfactants and defoamers, in addition to nitrite and molybdate.

In another embodiment of the present invention, the additive component includes a mixture of nitrite, nitrate and molybdate compounds. A useful additive component comprises nitrite, nitrate, phosphate, silicate, borate, molybdate, tolyltriazole, organic acid, scale inhibitor, surfactant and defoamer. Such an additive is sold by Fleetguard under the trademark DCA-4 Plus.

The additive component may be present in any suitable form, for example, liquid, gel, semi-solid, solid, e.g., either as a single object or unit, or as a plurality of particles, and the like and mixtures thereof.

The Sustained Release Component

The sustained release component, e.g., the matrix material and/or the coating material, as described herein is effective to reduce a release rate of the additive component from the coolant additive composition into the coolant, preferably relative to an identical coolant additive composition without the sustained release component. The level of additive component in the circulating coolant is thereby stabilized, maintained or replenished.

Preferably, the sustained release component comprises one or more polymeric materials.

A suitable polymeric material for use in the compositions of the present invention is preferably able to remain stable in a high temperature cooling system. The polymeric material preferably has a melting point in excess of the coolant operating temperature, for example, a melting point in the range of about 50° C. to about 200° C. More preferably, the melting point is in the range of about 120° C. to about 150° C. or higher. Also, the polymeric material, at least initially, preferably is hard and non-sticky. The polymeric material preferably is insoluble or partially soluble in the coolant at the operating temperature of the cooling system.

It is to be appreciated that the matrix material may comprise a material that is soluble in coolant liquid. For example, a coolant additive composition in accordance with the present invention may comprise a coolant-soluble matrix material mixed with an additive component, wherein the soluble matrix material provides sustained additive release by gradually dissolving into the coolant, thereby gradually releasing the additive located in the matrix material. Naturally, a suitable soluble matrix material dissolves cleanly in the coolant without clogging or otherwise degrading components of the cooling system. In one useful embodiment, the coolant soluble matrix material, when dissolved in the coolant also functions as a coolant additive, that is acts to provide at least one benefit to the coolant.

The polymeric material may be a viscous liquid, a gel or a solid. The matrix material, e.g., in a molten form or a soluble form, is combined, for example, mixed with the additive component. After the mixing step, the additive/matrix mixture is formed into one or more discrete units having irregular or regular shape and size. The polymeric material may be at least partially soluble in the coolant and, in one very useful embodiment, may be useful to provide a benefit to the coolant, such as one or more anticavitation, defoaming, descaling and the like properties.

Without wishing to limit the invention to any mechanism or theory of operation, it is believed that when these discrete units of additive/matrix composition are placed in contact with coolant in a cooling system, the solid polymeric material serves as a physical barrier between the coolant and the additive component to limit the rate of exposure of coolant additives to the coolant, and thus reduce the rate of diffusion of additives into coolant. Over time, the additives are leached from the additive/matrix composition at a substantially constant rate to provide benefits to the coolant and the cooling system.

In a preferred embodiment, the polymeric material includes polymer repeating units derived from an olefin component having 2 to about 12 atoms per molecule. Such polyolefins are generally polymers of unsubstituted, aliphatic hydrocarbon olefins of 2 to about 12 carbon atoms, and are more particularly polymers of an unsubstituted, aliphatic hydrocarbon olefin of 2 to about 12 carbon atoms and a substituted, aliphatic hydrocarbon olefin of 2 to about 12 carbon atoms. In one preferable embodiment, the polymeric material is oxidized. In another preferred embodiment, the polymeric material is amidized.

In one embodiment, the matrix material includes an aliphatic acid component, for example, as aliphatic acid component which includes aliphatic acid molecules having about 18 or about 28 to about 36 carbon atoms. A particularly useful aliphatic acid component is montanic acid, nominally $C_{28}H_{56}O_2$. Suitable aliphatic acid components, for example, montanic acids, preferably, have melting points from about 76° C. to about 87° C., more preferably about 76° C. to about 81° C. In one useful embodiment, the aliphatic acid component has a melting point of at least about 80° C. or at least about 82° C. Montanic acids with these characteristics are known, for example, under the trade name S-Wachs.

In a preferred embodiment, the aliphatic acid component, for example, montanic acid, may also be esterified to form an aliphatic acid ester wax, for example, a montanic acid ester wax. The aliphatic acid ester wax preferably has a predominant ingredient of esters of about $C_{20}$ to about $C_{30}$ fatty acids, including montanic acid.

In another preferred embodiment, the montanic acid may link with other aliphatic carboxylic acids to form carboxylic acid amides. For example, montanic acids may be linked to at least one aliphatic carboxylic acid having at least about 10 carbon atoms, preferably from about 14 to about 25 carbon atoms, with at least difunctional polyamines, polyols, or alkanolamines having molecular weights from about 60 to about 400, preferably from about 60 to about 200.

Other polymeric materials are also capable of forming the sustained release component. These polymeric materials include: ethylcellulose, cellulose, silicones, rubbers, fatty and synthetic surfactants, thermoplastic resins, adsorbents (clays) and mixtures thereof.

Preferred polyolefins are prepared from unsubstituted, aliphatic hydrocarbon monoolefins, including straight chain and branched chain compounds such as ethylene, propylene and butene-1, isobutene, pentene, hexene, heptene, octene, isobutene, 3-methylbutene-1,4-methylpentene-1, 4-methylhexene-1, and 5-methylhexene-1.

The polyolefin also preferably contains an unsubstituted, aliphatic hydrocarbon polyene, such as diene or triene, as a monomer unit. Such unsubstituted compounds can be straight chain, branched chain or cyclic compounds. Preferably polyenes of from about 4 to about 12 carbon atoms are employed.

Suitable comonomers for preparing the polyolefins are those utilized to prepare homopolymers as listed above such as propene or butene-1 with ethylene or isobutylene with isoprene and the like. Suitable termonomers are those utilized to prepare homopolymers and copolymers as disclosed above such as propene, ethylene and the like containing up to 15 percent, preferably up to about 10 percent by weight of polyene, for example, a diene such as dicyclopentadiene, 1,3-butadiene, 1,5-cyclooctadiene, 2-ethylidenenorbornene-5, 1,4hexadiene, 1,4-heptadiene, bicyclo(2.2.1)hepta-2,5-diene and other conjugated and especially non-conjugated dienes with linear or cyclic chains.

Trienes such as isopropylidene cyclopentadiene and the Diels-Alder mono- and di-adducts thereof with cyclopentadiene can be used in place of the diene.

Unsubstituted aliphatic diolefins can also be used for preparing useful polyolefins such as butadiene, isoprene, octadiene, and the like. Especially useful are the various forms of polybutadiene, such as made in emulsion, suspension or solution processes, and random, block, and star block polymers with monomers such as styrene.

In another embodiment, the polymeric material further includes different polymer repeating units derived from an ethylenically unsaturated monomer. In one embodiment, such polymeric material is polyethylene.

In a preferred embodiment, the polymeric material is a copolymer of ethylene and vinyl acetate, for example, a polyethylene/vinyl acetate copolymer sold by Dupont under its trademark ELVAX. Polyethylene/vinyl acetate copolymer is able to withstand very high temperatures. In one embodiment, the polymeric material is a copolymer of ethylene and butylene.

In another preferred embodiment, the polymeric material is polypropylene, for example polypropylene wax, e.g., having a molecular weight of about 500,000. Such polypropylene is sold under the trademark Coathylene PY 0787F. Other ethylenically unsaturated monomers include ethylene-propylene copolymers ranging in molecular weight from about 200,000 to about 300,000; ethylene-ethylacrylate polymers ranging in molecular weight from about 200,000 to about 300,000. One polymer that has been found to be highly satisfactory and which is preferred is polyisobutylene ranging in molecular weight from approximately about 60,000 to about 135,000, and a preferred polyisobutylene is identified by the registered trademark VISTANEX and is manufactured by the Enjay Chemical Company. Repeating units derived from an ethylenically unsaturated monomer used to form the polymeric material includes: monoolefinic hydrocarbons, i.e. monomers containing only carbon and hydrogen, including such materials as ethylene, propylene, 3-methylbutene-1,4-methylpentene-1, pentene-1, 3,3-dimethylbutene-1,4,4-dimethylbutene-1, octene-1, decene-1, styrene and its nuclear, alpha-alkyl or aryl substituted derivatives, e.g., o-, - or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethylhexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, ally alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1,3-octenonitrile, crotononitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g., butadiene-1,3; 2-methylbutadiene-1,3, 2,3-dimethylbutadiene-1,3; 2-methylbutadiene-1,3; 2,3-dimethylbutadiene-1,3; 2-chlorobutadiene-1,3; 2,3-dichloro-butadiene-1,3; and 2-bromo-butadiene-1,3 and the like. Mixtures of the foregoing compounds can also be employed. Particularly useful monomer compositions also include styrene, methyl methacrylate, methyl acrylate, vinyl acetate, mixtures of styrene and acrylonitrile, and mixtures of styrene and various maleates.

In one embodiment, the matrix material may be a mixture of polymers selected to achieve a desired release rate, hardness and/or solubility. Such mixtures may include, for example, polyethylene/polypropylene, preferably ethylene/butylene, which has superior durability. The matrix material may further serve as a structural agent to the coolant additive composition by retaining the shape of the composition.

In a very useful embodiment of the present invention, the sustained release component is partially soluble in the coolant. Preferably, the sustained release component includes a portion which is soluble in the coolant and is effective when released into the coolant, for example, when solubilized into the coolant, to provide a benefit to the coolant. Thus, the partially soluble sustained release component, for example, the matrix material and/or the coating material, is effective not only to reduce the release rate of the additive component into the coolant, but in addition, can also act as an additional additive component in that the coolant is provided with a benefit when the soluble portion of the sustained release component is released into the coolant.

The polymeric material or materials used to produce the sustained release component can be selected or chosen so that a portion of the polymeric material or materials in the sustained release component is soluble in the coolant. In one embodiment, the monomers which are used to produce such polymeric material or materials are chosen to provide the coolant soluble portion of the sustained release component. In effect, the polymeric material or materials included within the sustained release component can be customized to provide the desired degree of coolant solubility and a desirable benefit to the coolant when the soluble portion is solubilized in the coolant. Such partially soluble sustained release components are included within the scope of the present invention.

In accordance with the present invention, the sustained release component may be a matrix and/or a coating. When the additive component is located within, e.g., distributed within, the sustained release component, the sustained release component is referred to as a matrix or matrix material. When the sustained release component is coated around the additive component, the sustained release component is referred to as a coating or coating material. When both a matrix material and a coating material are present, the combination of these materials can be referred to as a sustained release component. Preferably, if both a matrix material and a coating material are present, the release rate of the additive from the coolant additive composition is reduced relative to an identical coolant additive composition without one of the matrix material and the coating material.

If a coating is provided on an additive component without the presence of a matrix material, the coating or coating material should be partially soluble in the coolant, with the soluble portion being effective, when released into the coolant, to provide a benefit to the coolant. Such coatings are highly advantageous in that they are effective both to reduce the rate of release of the additive component into the coolant and to provide a further benefit to the coolant when partially solubilized into the coolant. Of course, the sustained release component may be substantially insoluble in the coolant.

In one embodiment, the coolant additive composition is layered. For example, the innermost core of the coolant additive composition may be a mixture of an additive component and a first matrix material. The next layer of the additive composition may be a mixture of an additive component and a matrix material different from the first. Alternatively, the next layer may be a mixture of the additive component and the matrix material of the first layer, but having a different mixture ratio. The additive composition of the present invention may include more than one layer to achieve a varied release pattern. In one embodiment, the additive composition comprises more than two layers. In another embodiment, the additive composition comprises more than three layers. Such layered additive composition provides for a variable release profile, for example a pattern of release varying between fast and slow. For example, the additive composition may include an outer layer structured to provide a minimal, low level rate of additive release and an inner layer structured to provide a relatively higher rate of additive release.

Other arrangement schemes may serve to vary the release pattern of the additive component. For example, an additive composition of the present invention may comprise a particulate additive component which is mixed with a polymeric matrix material which is then formed into discrete pellets, which are then mixed with another polymeric material and then formed into a unitary object sized and shaped to be placed within a coolant line of a cooling system.

In one embodiment, an additive composition of the present invention may further include a release enhancer component to increase the release rate. A release enhancer component may be selected from wicking materials, surfactants, for example, non-ionic surfactants, e.g., polyoxyethylene-polyoxypropylene block copolymers and the like, and mixtures thereof. Such wicking materials may include, without limitation, cotton and polyester fibers and mixtures thereof. The fibers provide a wicking mechanism for exposing coolant to inner portions of the additive composition.

In one embodiment, an additive composition of the present invention may further include a reinforcement component to reinforce the structure of the additive composition, making it less susceptible to erosion by flowing coolant. Such a component may include, for example, fibers, for example, cotton, polyester and/or fiberglass fibers.

These supplemental components (i.e. release-enhancer components and reinforcement components) are added to the matrix material, preferably while the matrix material is in a fluid or molten state prior to, or during, mixing of the molten material with the additive component.

In a preferred embodiment, the matrix material is polypropylene wax, sold under the trademark Licowax PP 230. Polypropylene wax is preferable due to its insolubility in coolant at high temperatures.

In another embodiment, the matrix material is polyethylene wax, preferably oxidized polyethylene wax, sold under the trademark Licowax PED Wax 522 by Clariant.

In one embodiment of the invention, the additive composition of the present invention includes an outer coating material which encases the discrete units of additive/matrix material. The coating material may be selected from any of the sustained release components disclosed above. In one embodiment, the coating material includes an emulsion polymer and/or a polymeric material in a solvent material. The solvent material may be aqueous, alcoholic or organic in nature or may be a mixed solvent. Of course, the solvent should be selected so that the coating material is soluble therein and the solvent has no significant detrimental effect on the coating material, the additive composition, or on the performance of the final product. In a preferred embodiment, the coating material is polyethylene vinyl acetate.

If the coating material is coolant-insoluble, the coating is preferably sufficiently porous, or breakable when exposed to high temperature coolant, to allow the coolant to penetrate or break the coating and contact the additive/matrix material encased therein.

The rate of release of the additives may be adjusted by the relative percentage of matrix material to additive component. For example, more matrix material content in the additive composition generally reduces the rate of additive release. In one embodiment, the matrix materials constitute about 10% to about 90% of the total additive composition weight. In a preferred embodiment, the matrix materials constitute about 25% to about 70%, and more preferably about 50%, of the total additive composition weight.

In the embodiment of the present invention in which the composition comprises a coated additive/matrix composition, the rate at which the additives are to released may be adjusted by the thickness of the coating. In a preferred embodiment, the coatings constitute about 5% to about 50% of the total additive composition weight. In a more preferred embodiment, the coatings constitute about 8% to about 25% of the total additive composition weight.

The coolant additive compositions of the present invention may be present in the cooling system in the form of a single object, for example a single, puck-shaped, or "doughnut" shaped object. In another embodiment, the composition is present as a plurality of irregular or regular shaped pellets, tablets, etc. Different shapes and sizes and the various surface to volume ratios provided thereby, can be selected to provide a desired additive release rate.

In a preferable embodiment, the additive/matrix composition is in the form of a cylindrical tablet. The tablet may be about 9 mm length×about 9 mm diameter. Alternatively, the tablet may be substantially cubical with all sides being about 9 mm. In yet another embodiment, the additive composition is a flat puck with a central aperture, and having an outside diameter of about 8 cm, an inside diameter of about 5 cm and a height of about 3 cm.

To form the additive-matrix composition in accordance with the present invention, the additive component, for example, a coolant additive component comprising a mixture of buffer, cavitation liner inhibitor and a metal corrosion inhibitor, is physically mixed with the matrix material in molten form, for example oxidized polyethylene wax, amidized polyethylene wax, preferably propylene wax, and allowed to solidify in a mold. In one embodiment, the matrix material may be a one-component or multiple component cure. For example, a monomer with catalyst or a two part polymer, such as an epoxy or urethane, that is mixed with the additive and will polymerize and harden to a solid. In one embodiment, the matrix material is initially a solid in the formed composition which softens or deforms upon exposure to the coolant at system operating temperatures. In other embodiments, the matrix material is initially a gel or a viscous fluid in the composition.

Referring to FIG. 1, an additive assembly in accordance with one embodiment of the invention is shown generally at 1. The additive assembly 1 includes a housing 2 with an inlet port 3, an outlet port 4, and a chamber 5 including coolant additive composition 6 contained therein. The additive assembly 1 is adapted to be placed "in-line" at a suitable location along a coolant line, for example, in a cooling system of an internal combustion engine. Coolant flowing in the coolant line (not shown) will enter the assembly inlet port 3, flow into the chamber 5 and contact the coolant additive composition 6. The coolant additive composition 6, as described elsewhere herein, comprises a sustained release component, in the form of a coolant insoluble matrix, and a coolant additive component distributed throughout the matrix. Coolant having a portion of the additive composition 6 dissolved therein then passes from the chamber 5 through the outlet port 4.

Figure 2:
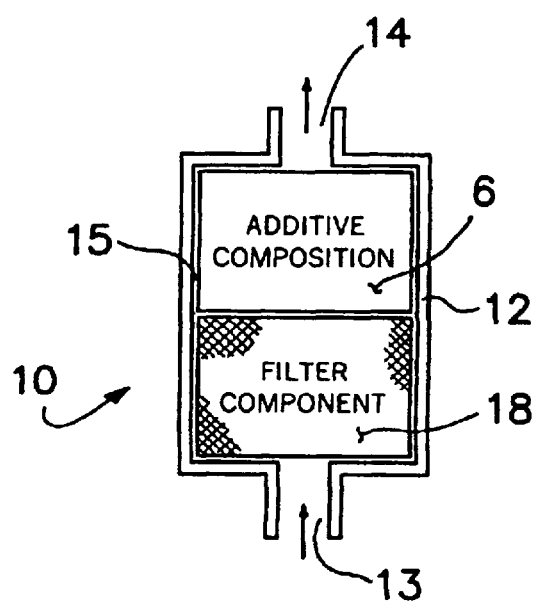
FIG. 2 is a front elevational view in full section of a coolant filter assembly according to a general embodiment of the present invention.

Referring now to FIG. 2, another coolant additive assembly in accordance with the present invention is shown generally at 10. The additive assembly 10 includes the basic components of construction that are typical of a conventional coolant filter. In the shown embodiment 10, a housing 12 is provided which includes inlet port 3, outlet port 4, and chamber 15. As shown, the housing 12 is adapted to contain both the coolant additive composition 16 and a filter element 18 in chamber 15.

The inlet port 13 receives coolant into the housing 12. The filter component 18 disposed within the housing 12 filters the coolant. After it is filtered, the coolant comes into contact with the additive composition 16. The additive composition 16, comprising a sustained release component and an additive component, in accordance with the present invention, releases additives into the filtered coolant. Composition 16 is similar to composition 6 except that composition 16 also includes a polymeric coating effective to reduce the rate of additive release into the coolant relative to the rate obtained using composition 6. In addition, the polymeric coating of composition 16 is partially soluble in the coolant. The soluble portion of the coating is effective, when solubilized in the coolant, to provide a benefit to the coolant. Thus, the coating both reduces the release rate of the additive component into the coolant and itself provides an additional benefit to the circulating coolant.

The filtered coolant containing additives exits the housing 12 through the outlet port 4 and travels to downstream components of the coolant system.

Figure 3:
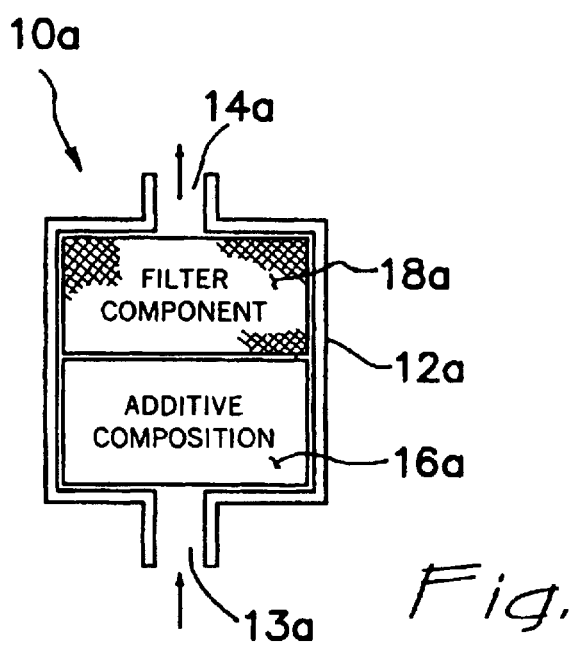
FIG. 3 is a front elevational view in full section of a coolant filter assembly according to another embodiment of the present invention.

FIG. 3 illustrates another embodiment of the invention, coolant additive assembly 10a, which is structured similarly the coolant additive assembly 10 shown in FIG. 2. In assembly 10a, coolant in a coolant line enters housing 12a through inlet port 3a and contacts the additive composition 16a before being filtered through filter element 18a. Filtered coolant containing the additives then exits the filter assembly via the outlet port 14a. FIGS. 2 and 3 illustrate that the additive composition 16, 16a can be located either upstream or downstream of the filter element 18, 18a.

The following examples illustrate certain aspects of the present invention and are not intended to limit the scope of the invention.

EXAMPLE 1

Forming an Additive/Matrix Composition

A mixture of coolant additives, in the form of pellets or granules comprising nitrite, nitrate, phosphate, silicate, borate, molybdate, tolyltriazole, organic acid, scale inhibitor, surfactant and defoamer, is mixed with a matrix material comprising molten polyethylene wax. The materials are mixed only long enough to distribute the additive pellets or granules somewhat uniformly throughout the molten wax. The pellets or granules are not dissolved into the molten wax, but retain substantially their original pellet or granular form. While in the molten state, the additive/polyethylene wax mixture is then deposited into a mold to form a flat puck-shaped form, the puck-shaped form having a central hole an outside diameter of 8 cm, an inside diameter of 5 cm and a height of 3 cm. The mixture is allowed to solidify while in the mold and then the solid puck-shaped composition is removed from the mold. Alternately, the molten additive/polyethylene wax mixture is cooled to form small pellets, which can be considered pastilles.

EXAMPLE 2

Forming a Coated Additive/Matrix Composition

The puck-shaped additive matrix composition of Example 1 is coated with a coating material by placing a plurality such puck-shaped forms onto a rotating pan inside a drum coater chamber. While the pan is rotated, a dispersion of commercially available ethylene/vinyl acetate copolymer is pumped and sprayed through a nozzle onto the surfaces of the forms. The spray rate is maintained at about 15 grams of dispersion per minute. The spray pattern is controlled to give a good mist of copolymer droplets.

At the same time, through a very slightly reduced pressure, a stream of warm air of about 40° C. is passed through the chamber to remove the water vapor from the polymer mist (or small droplets), before and after they reach the composition surfaces.

With time, the copolymer gradually forms a layer of coating on each of the forms. After all copolymer dispersion is sprayed to reach the desired thickness of coating, the resulting coated forms are allowed to stay on the rotating pan for a few more minutes, then are decanted from the pan into a container for storage.

Alternately, the pastilles noted in Example 1 are coated with the copolymer in a spray drum coater.

EXAMPLE 3

Method of Using the Additive/Matrix Composition

Several additive/matrix composition puck-shaped forms of Example 1 are placed into a coolant filter canister during manufacture of the canister. In use, the coolant filter canister is placed in fluid communication with a circulating aqueous-based coolant system in a vehicle spark-ignited engine. Once connection has been made and fluid communication is established between the cooling system and the canister, the coolant is circulated when the engine is running, allowing the aqueous-based coolant to contact the additive/matrix composition forms disposed in the canister. Upon contact with the forms, the high temperature coolant will soften the polymer matrix material, allowing the form to deform sufficiently to release pellets or granules of additive into the coolant. The released additive granules dissolve in the circulating coolant. The gradual release of additive, for example, at a substantially uniform rate, continues during each circulation of coolant through the filter canister until, eventually, all additive is depleted from the polymer matrix. In this example, the canister includes filtering media for filtering coolant exiting the canister and preventing larger particulate additive from entering the coolant system. The spent matrix form is removed from the circulating system by simply removing and properly disposing the filter canister and thereafter replacing the canister with another new filter canister, preferably including several additive/matrix composition forms in accordance with the present invention.

EXAMPLE 4

Method of Using a Coated Additive/Matrix Composition

A coated additive/matrix composition in the form of 9 mm cylindrically shaped forms are used in an engine cooling system. The compositions comprise an additive component similar to that sold by Fleetguard under the trademark DCA 4 Plus distributed throughout a matrix of montanic acid ester wax and coated with ethylene vinylacetate copolymer. Up to 200 of these unitary coated compositions are packed into a reservoir or housing connected, e.g., along and in the fluid communication with an engine cooling system line. An aqueous coolant is pumped through the cooling system line and through the packed reservoir. Upon contact with the high temperature coolant, the coating of the cylindrical forms in the reservoir begins to soften and break, allowing the coolant to contact the additive/matrix encased therein. The additive in the matrix is released into the coolant providing benefits thereto.

As an alternative to the coated additive matrix composition disclosed above, the ethylene/vinyl acetate copolymer coating is replaced with a partially soluble coating material. Upon contact with the high temperature coolant, the coating of the cylindrical forms in the reservoir partially dissolves, releasing a portion of the coating into the coolant to provide at least one benefit to the coolant. In addition, the coolant is able to penetrate the partially solubilized coating to contact the additive/matrix encased therein. The additive in the matrix is released into the coolant, providing benefits thereto.

While this invention has been described with respect to various specific examples and embodiments, it is to be understood that the invention is not limited thereto and that it can be variously practiced with the scope of the following claims.

What is claimed is:

1. A coolant additive composition comprising:
   a matrix material and an additive component, the additive component being distributed substantially throughout the matrix material and effective, when released into a coolant, to provide at least one benefit to the coolant, the matrix material is effective to reduce the rate of release of the additive component into the coolant relative to an identical composition without the matrix material.

2. The additive composition of claim 1 wherein the matrix material comprises at least one polymeric material.

3. The additive composition of claim 1 wherein the matrix material is substantially insoluble in the coolant or is partially soluble in the coolant.

4. The additive composition of claim 2 wherein the matrix material includes a portion which is soluble in the coolant and is effective, when released into the coolant, to provide at least one benefit to the coolant.

5. The additive composition of claim 1 wherein the additive component comprises at least one active ingredient selected from the group consisting of microbiocides, buffers, cavitation liner pitting inhibitors, metal corrosion inhibitors, hot surface corrosion inhibitors, defoaming agents, hot surface deposition inhibitors, scale inhibitors, detergents, dispersants, surfactants and mixtures thereof.

6. The additive composition of claim 1 wherein the matrix material is initially a solid in the composition or initially a gel in the composition.

7. The additive composition of claim 2 wherein the polymeric material includes polymer-repeating units derived from an olefin component having 2 to about 12 carbon atoms per molecule.

8. The additive composition of claim 7 wherein the olefin component is selected from a group consisting of ethylene, propylene and mixtures thereof.

9. The additive composition of claim 7 wherein the olefin component is ethylene.

10. The additive composition of claim 2 wherein the polymeric material comprises a copolymer of ethylene and vinyl acetate.

11. The additive composition of claim 2 wherein the polymeric material is at least partially oxidized.

12. The additive composition of claim 2 wherein the polymeric material is an oxidized polyethylene wax.

13. The additive composition of claim 1 wherein the matrix material includes an aliphatic acid component.

14. The additive composition of claim 1 wherein the composition is substantially solid and has more than one layer, each layer comprises a different mixture of the additive component and the matrix material.

15. The additive composition of claim 1 further comprising a coating material surrounding at least a portion of the additive material and the matrix material, the coating material being present in an amount effective to reduce the rate of release of the additive component into the coolant relative to an identical additive composition without the coating material.

16. The additive composition of claim 15 wherein the coating material comprises a coating polymeric material.

17. The additive composition of claim 16 wherein the coating polymeric material comprises polyethylene vinyl acetate.

18. The additive composition of claim 15 wherein the coating material is substantially insoluble in the coolant or partially soluble in the coolant.

19. The additive composition of claim 18 wherein the coating material includes a portion which is soluble in the coolant and is effective, when released into the coolant, to provide at least one benefit to the coolant.

20. The additive composition of claim 1 wherein the composition further comprises a release enhancer component in an amount effective to increase the release rate of the additive component from the composition relative to an identical composition without the release enhancer component.

21. The additive composition of claim 1 wherein the composition further comprises a reinforcement component in an amount effective to increase the structural strength of the composition relative to an identical composition without the reinforcement component.

22. A method of producing an additive composition for providing a benefit to a coolant, comprising the steps of:
   combining an additive component with a matrix material to form a mixture, the additive component being distributed substantially throughout the matrix material and being effective to provide at least one benefit to a coolant when released into the coolant, the matrix material comprising a polymeric material, and
   forming one or more discrete units of the mixture, the matrix material being present in an amount effective, when the one or more discrete units are contacted with a coolant, to reduce the rate of release of the additive component into the coolant.

23. The method of claim 22 wherein the one or more discrete units provide a reduced rate of release of the additive component into a coolant relative to an identical one or more units without the matrix material.

24. The method of claim 22 which further comprises providing a coating material on the one or more discrete units, the coating material being effective to reduce the rate of release of the additive component into a coolant relative to an identical one or more units without the provided coating material.

25. The method of claim 24 wherein the matrix material in the one or more discrete units is substantially coolant insoluble or partially coolant soluble.

26. A method of producing an additive composition for providing a benefit to a coolant comprising the steps of:
   providing an additive composition including at least one additive effective, when released into a coolant, to provide a benefit to the coolant; and
   providing a coating material on the additive composition to form a coated additive composition, the coating material being partially coolant soluble and effective, when the coated additive composition is contacted with a coolant, to reduce the rate of release of the additive composition into a coolant relative to an identical additive composition without the coating material, the coating material further including a portion which is soluble in a coolant and is effective, when released into the coolant, to provide at least one benefit to the coolant.

27. A coolant additive composition comprising a sustained release component including both a matrix and a coating, and an additive component distributed substantially throughout the matrix material, the additive component is effective to provide at least one benefit to a coolant when released into the coolant,
   the sustained release component is partially soluble in the coolant and is effective to reduce the rate of release of the additive component into the coolant relative to an identical composition without the sustained release component.

28. The additive composition of claim 27 wherein the sustained release component comprises at least one polymeric material.

* * * * *